United States Patent
Asano (10) Patent No.: US 6,318,805 B1
(45) Date of Patent: Nov. 20, 2001

(54) RECLINING MECHANISM FOR VEHICLE SEAT

(75) Inventor: Makoto Asano, Toyota (JP)

(73) Assignee: Araco Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 09/337,326

(22) Filed: Jun. 21, 1999

(30) Foreign Application Priority Data

Jun. 22, 1998 (JP) ................................................. 10-175083

(51) Int. Cl.$^7$ ....................................................... B60N 2/22
(52) U.S. Cl. ........................................... 297/367; 297/366
(58) Field of Search ..................................... 297/366, 367, 297/368, 369

(56) References Cited

U.S. PATENT DOCUMENTS

| | | |
|---|---|---|
| 5,590,931 | 1/1997 | Fourrey et al. . |
| 5,622,407 | 4/1997 | Yamada et al. . |
| 5,632,525 | 5/1997 | Uramichi . |
| 5,762,400 | 6/1998 | Okazaki et al. . |
| 5,788,325 * | 8/2000 | Ganot .................................. 297/367 |
| 5,881,854 * | 3/1999 | Rougnon-Glasson ................ 297/367 |
| 6,102,480 * | 8/2000 | Asano .................................. 297/367 |

FOREIGN PATENT DOCUMENTS

| | | |
|---|---|---|
| 198 14 225 A 1 | 3/1998 | (DE) . |
| 56-52010 | 5/1981 | (JP) . |
| 7-136032 | 5/1995 | (JP) . |
| 8-52040 | 2/1996 | (JP) . |

* cited by examiner

Primary Examiner—Anthony D. Barfield
(74) Attorney, Agent, or Firm—Reed Smith Hazel & Thomas LLP (57) ABSTRACT

A reclining mechanism for a vehicle seat, which is composed of a first arm member for attachment to a frame structure of a seat cushion or a back rest of the vehicle seat; a second arm member for attachment to a frame structure of the other of the back rest or the seat cushion, the second arm member being connected with the first arm member by means of a hinge pin for relative rotation about the hinge pin and having a circular ratchet portion concentric with the hinge pin; a pair of slide pawls slidably coupled with the first arm member in a radial direction with respect to the hinge pine to be moved toward and away from the ratchet portion of the second arm member; the slide pawls each being formed at their outer ends with a semi-circular toothed portion for engagement with the ratchet portion of the second arm member and at their inner ends with a pair of spaced legs; a cam element mounted on the hinge pin for rotation therewith and disposed between the inner ends of the slide pawls, the cam element having a pair of radial projections opposed to the spaced legs of the slide pawls; and a pair of spaced rollers disposed between the radial projections of the cam element and the spaced legs of the slide pawls to maintain the slide pawls in engagement with the ratchet portion of the second arm when retained in engagement with the spaced legs of the slide pawls under load of a torsion spring applied to the cam element and to permit disengagement of the slide pawls from the ratchet portion of the second arm member when released from the spaced legs of the slide pawls by rotation of the cam element against the load of the torsion spring.

3 Claims, 7 Drawing Sheets

RECLINING MECHANISM FOR VEHICLE SEAT

BACKGROUND OF THE INVENTION

1. Field of the Invention

The present invention relates to a reclining mechanism for a vehicle seat for adjusting an inclined angle of a back rest of the seat relative to a seat cushion.

2. Description of the Prior Art

Disclosed in Japanese Patent Laid-open Publication No. 8-52040 is a reclining mechanism for a vehicle seat which is composed of a pair of arm members for attachment to a frame structure of a seat cushion and to a frame structure of a back rest, the arm members being connected by means of a hinge pin for relative rotation about the hinge pin, a slide pawl slidably coupled with one the arm members to be moved in a radial direction with respect to the hinge pin for engagement with a ratchet portion of the other of the arm members and for disengagement from the ratchet portion, and a cam element mounted on the hinge pin for rotation therewith and engaged with the slide pawl for maintaining the slide pawl in engagement with the ratchet portion of the arm member and for disengaging the slide pawl from the ratchet portion when it is rotated with the hinge pin. In the reclining mechanism, the relative rotation of the arm members is restricted by engagement of the slide pawl with the ratchet portion to lock the back rest at an inclined angle and is permitted by disengagement of the slide pawl from the ratchet portion for adjustment of the inclined angle of the back rest.

In the reclining mechanism, the engagement of the slide pawl with the ratchet portion of the arm member is maintained in a condition where the slide pawl is pressed by engagement with a portion of the cam element. When the cam element is rotated with the hinge pin to disengage the slide pawl from the ratchet portion of the arm member, the slide pawl is retracted by engagement with a portion of the cam element. If the reclining mechanism is applied with a heavy load, the slide pawl is slightly rotated due to an error in assembly of the component parts of the reclining mechanism. This results in looseness in engagement of the slide pawl with the ratchet portion of the arm member.

SUMMARY OF THE INVENTION

It is, therefore, a primary object of the present invention to provide a reclining mechanism for a vehicle seat wherein rotation of the slide pawl is prevented to firmly maintain the engagement of the slide pawl with the ratchet portion even if the reclining mechanism is applied with a heavy load.

According to the present invention, the object is accomplished by providing a reclining mechanism for a vehicle seat, which comprises a first arm member for attachment to a frame structure of a seat cushion or a back rest of the vehicle seat, a second arm member for attachment to a frame structure of the other of the back rest or the seat cushion, the second arm member being connected with the first arm member by means of a hinge pin for relative rotation about the hinge pin and having a circular ratchet portion concentric with the hinge pin, a pair of slide pawls slidably coupled with the first arm member in a radial direction with respect to the hinge pin to be moved toward and away from the ratchet portion of the second arm member, the slide pawls each being formed at their outer ends with a semi-circular toothed portion for engagement with the ratchet portion of the second arm member and at their inner ends with a pair of spaced legs, a cam element mounted on the hinge pin for rotation therewith and disposed between the inner ends of the slide pawls, the cam element having a pair of radial projections opposed to the spaced legs of the slide pawls, and a pair of spaced rollers disposed between the radial projections of the cam element and the spaced legs of the slide pawls to maintain the slide pawls in engagement with the ratchet portion of the second arm when retained in engagement with the spaced legs of the slide pawls under load of a torsion spring applied to the cam element and to permit disengagement of the slide pawls from the ratchet portion of the second arm member when released from the spaced legs of the slide pawls by rotation of the cam element against the load of the torsion spring.

In a practical embodiment of the present invention, it is preferable that a cam plate is mounted on the hinge pin for rotation therewith to disengage the slide pawls from the ratchet portion of the second arm member by engagement therewith when the cam element is rotated against the load of the torsion spring applied thereto to release the rollers from the spaced legs of the slide pawls.

BRIEF DESCRIPTION OF THE DRAWINGS

Other objects, features and advantages of the present invention will be more readily appreciated from the following detailed description of preferred embodiments thereof when taken together the accompanying drawings, in which.

DESCRIPTION OF THE PREFERRED EMBODIMENTS

Figure 1:
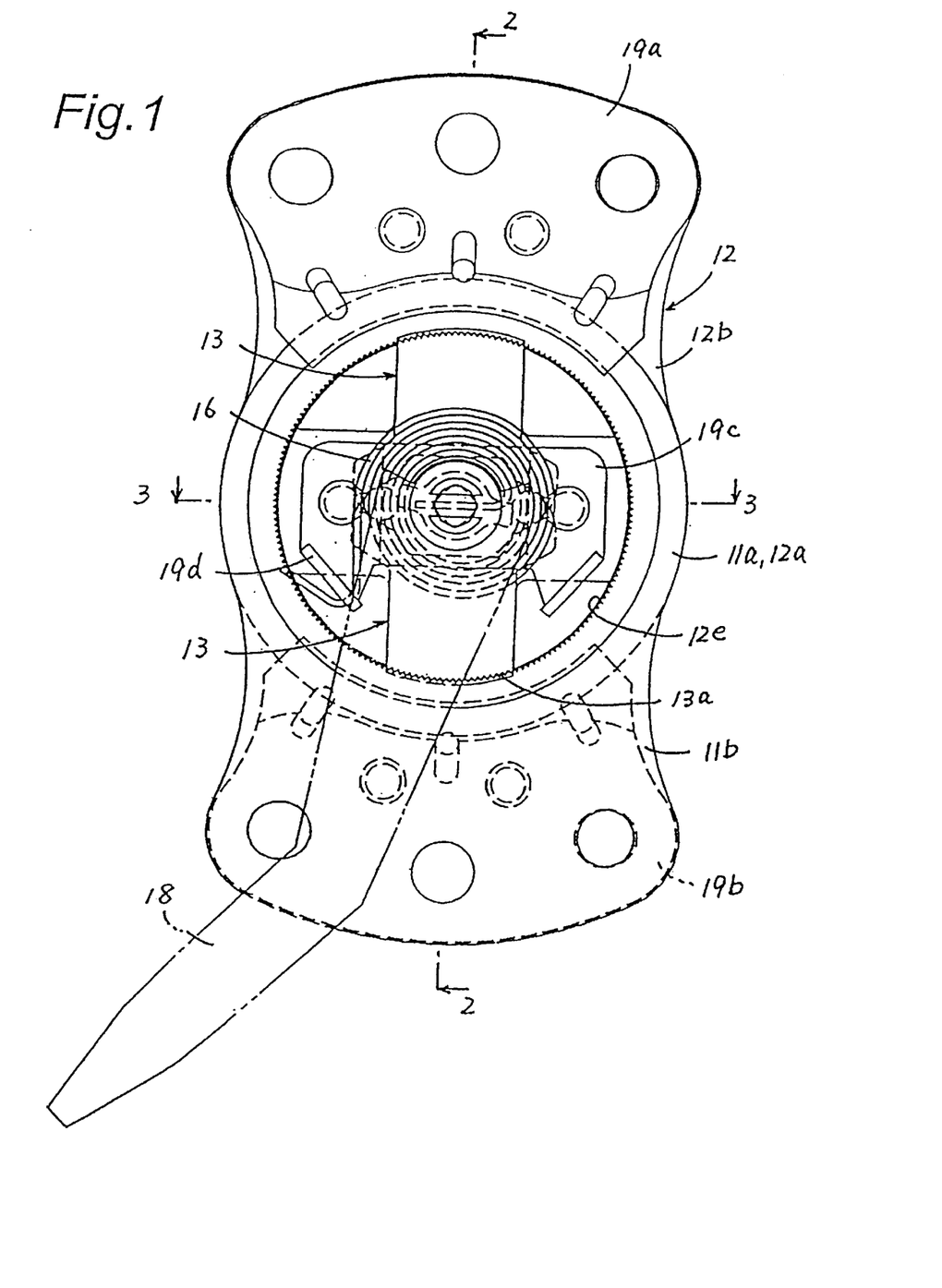
FIG. 1 is a partly broken front view of a reclining mechanism in accordance with the present invention.
Figures 2, 3:
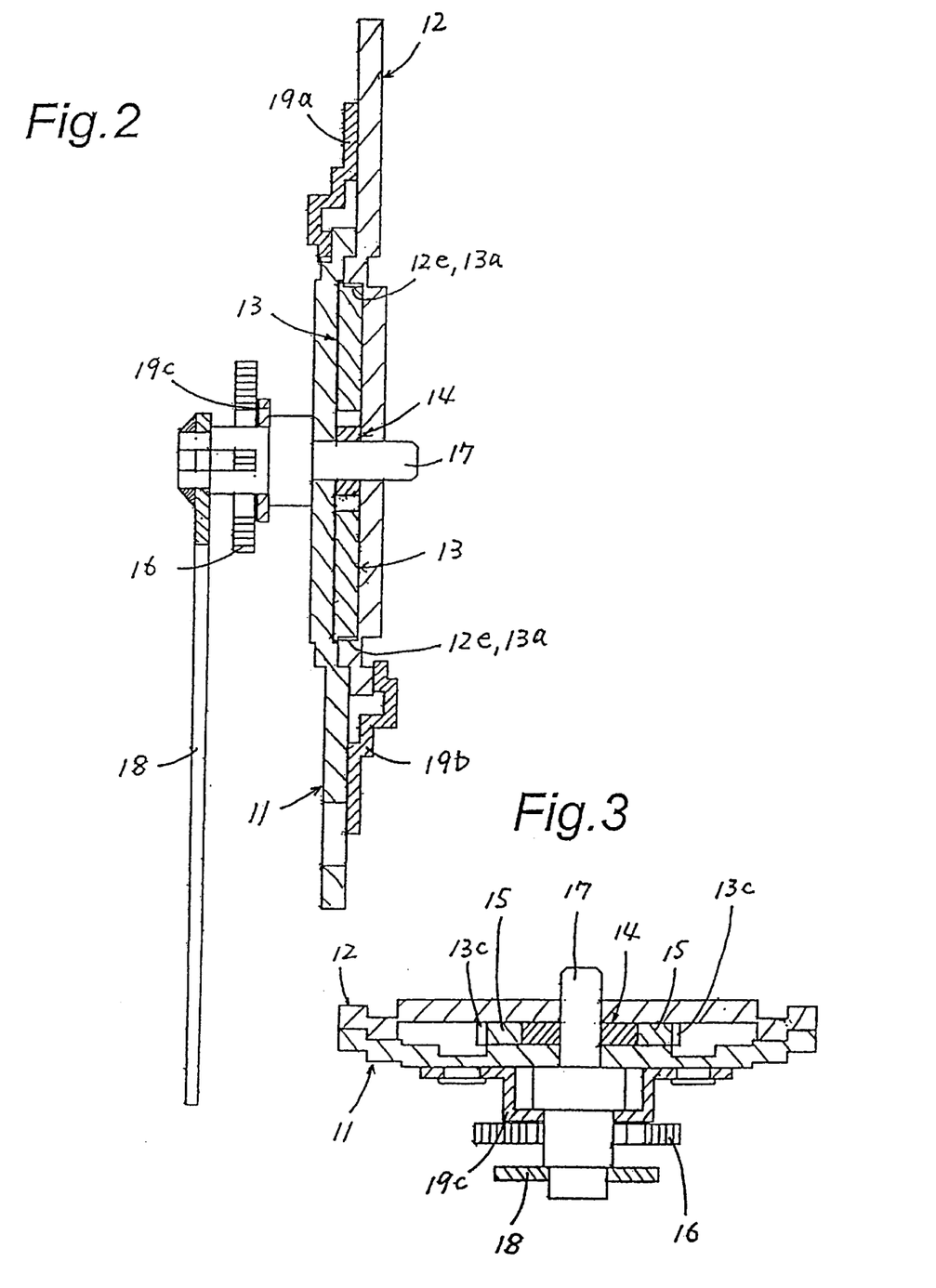
FIG. 2 is a vertical sectional view of the reclining mechanism taken along line 2—2 in FIG. 1.
FIG. 3 is a cross-sectional view of the reclining mechanism taken along line 3—3 in FIG. 1.
Figure 4:
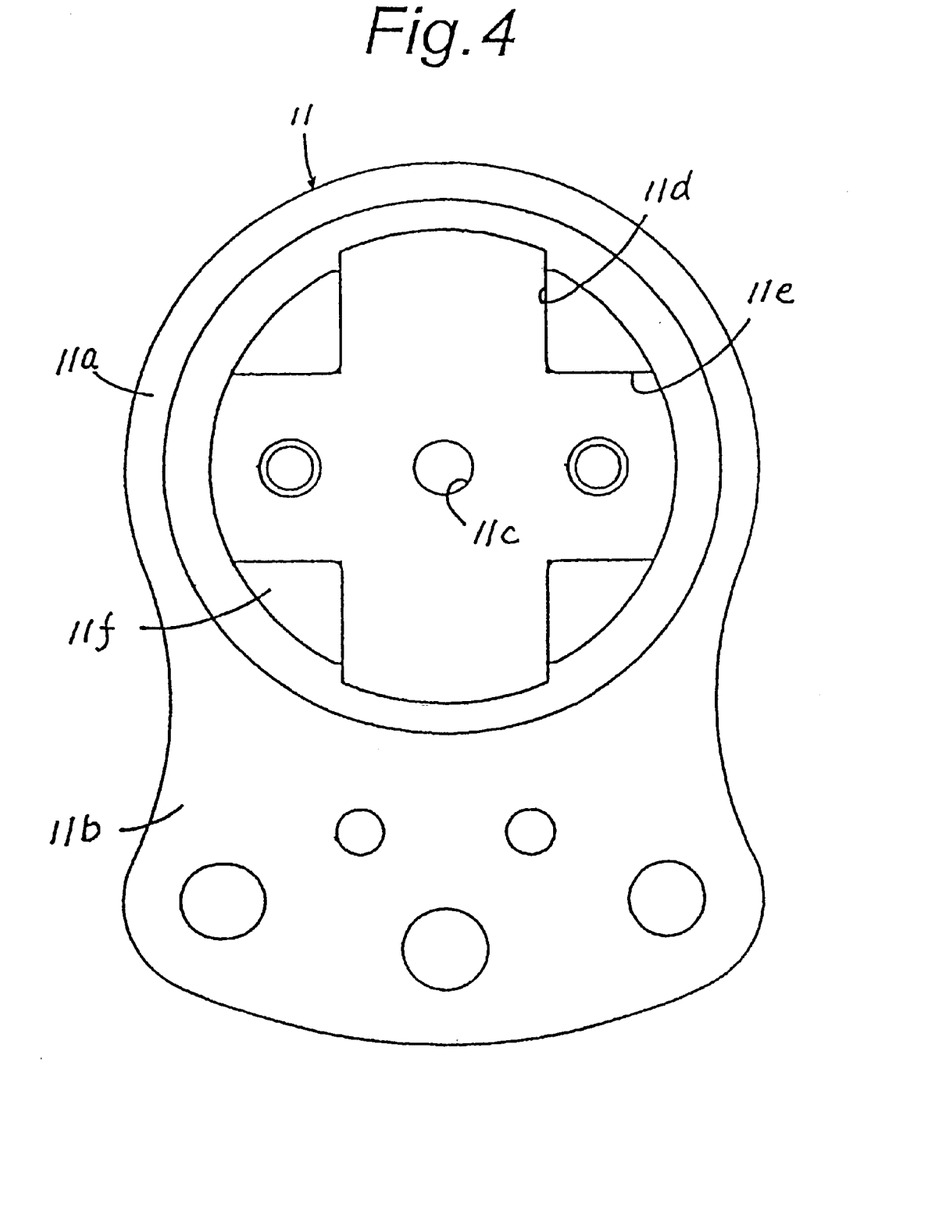
FIG. 4 is a front view of a first arm member shown in FIG. 1.
Figure 5:
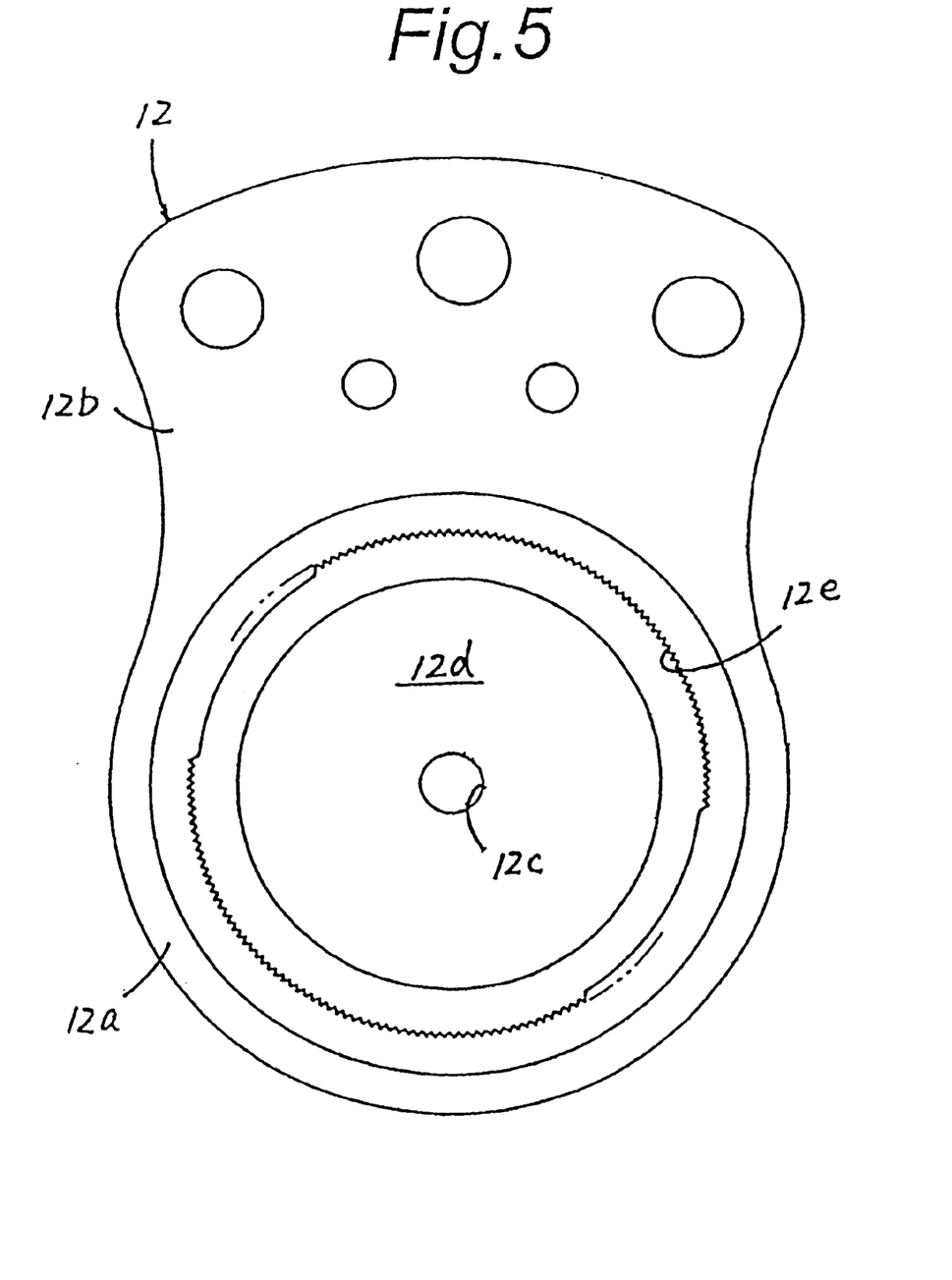
FIG. 5 is a front view of a second arm member shown in FIG. 1.

Illustrated in FIGS. 1 to 3 is a reclining mechanism for a vehicle seat in accordance with the present invention, which comprises a first arm member 11 for attachment to a frame structure of a seat cushion (not shown) of the vehicle east, a second arm member 12 for attachment to a frame structure of a back rest (not shown) of the vehicle seat, a pair of slide pawls 13, a cam element 14, a pair of rollers 15, a spiral torsion spring 16, a hinge pine 17 and an operation lever 18. The first and second arm members 11 and 12 are coupled to contain the slide pawls 13, cam element 14 and rollers 15 therein. The second arm member 12 is connected with the first arm member 11 by means of the hinge pin 17 for relative rotation about the hinge pin 17. The reclining mechanism is assembled with the vehicle seat in such a manner that the second arm member 12 is locked to the first arm member 11 at a selected position to retain the back rest at an inclined angle and that the second arm member 12 is released from the first arm member 11 to permit adjustment of the inclined angle of the back rest.

As shown in FIGS. 1 to 3 and 4, the first arm member 11 has an upper portion 11a formed to contain the slide pawls 13, cam element 14 and rollers 15 and a lower portion 11b for attachment to the frame structure of seat cushion. The upper portion 11a of first arm member 11 is formed therein with a vertical guide groove 11d across a central mounting hole 11c and a lateral guide groove 11e perpendicular to the vertical guide groove 11d. The vertical guide groove 11d is slightly extended outward from the inner periphery of a circular recess 11f formed in the upper portion 11a, while the lateral guide groove 11e is extended to the inner periphery of the circular recess 11f.

As shown in FIGS. 1 to 3 and 5, the second arm member 12 has a lower portion 12a formed to contain the slide pawls 13, cam element 14 and rollers 15 and an upper mounting portion 12b for attachment to the frame structure of the back rest. The lower portion 12a of second arm member 12 is formed with a circular recess 12d concentric with a central mounting hole 12c. The circular recess 12d and central mounting hole 12c are formed in the lower portion 12a of second arm member 12 to correspond with the circular recess 11f and central mounting hole 11c formed in the upper portion 11a of the first arm member 11. The circular recess 12d of second arm member 12 is formed at its inner periphery with a circular ratchet portion 12e.

Figure 6A:
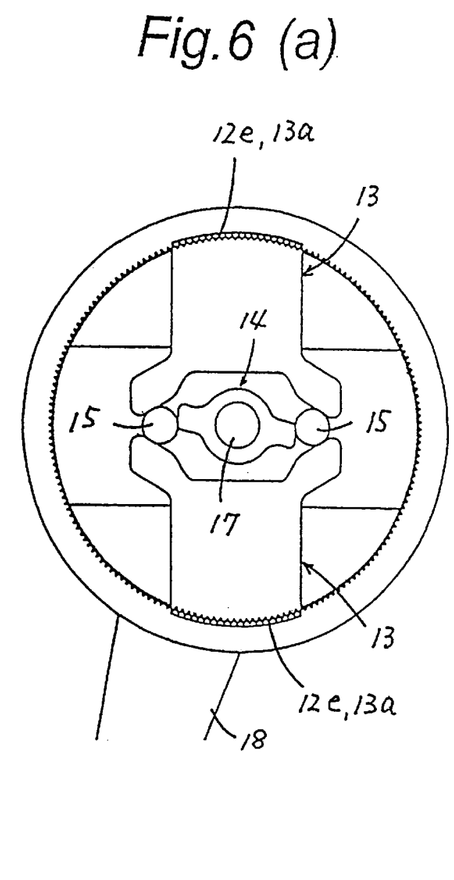
FIGS. 6(a) to 6(c) illustrate a mode of operation of the main component parts of the reclining mechanism shown in FIGS. 1 to 3.
Figure 6B:
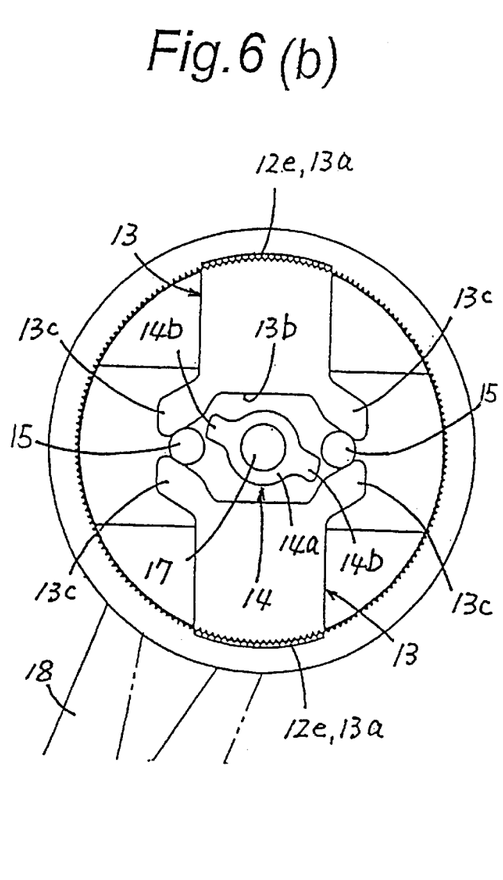
Figure 6C:
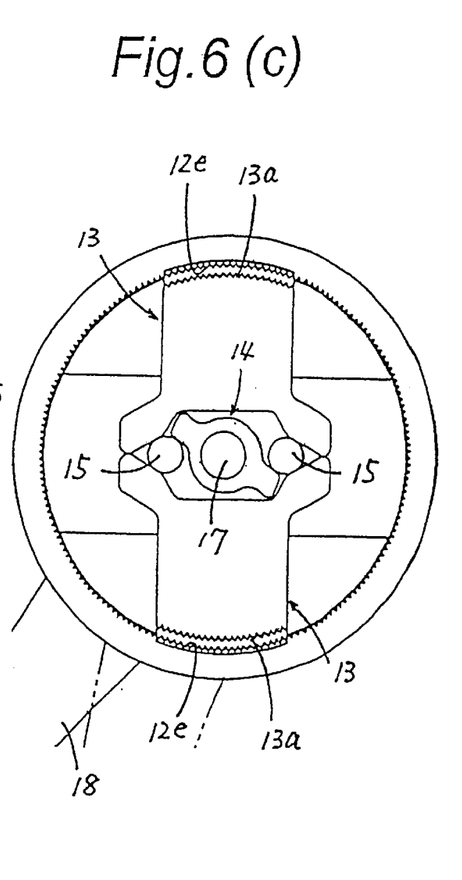

The slide pawls 13 are formed in the same width and thickness. As shown in FIG. 6, the slide pawls 13 each are formed at their outer ends with a semi-circular toothed portion 13a and at their inner end with a flat end surface 13b and a pair of spaced legs 13c. Each pair of spaced legs 13c of slide pawls 13 are widened into the lateral guide groove 11e and opposed to one another. The thickness of each of the slide pawls 13 is determined to correspond with a space defined by the vertical guide groove 11d of first arm member 11 and the circular recess 12d of second arm member 12, and the width of each of the side pawls 13 is determined to correspond with the width of the vertical guide groove 11d of first arm member 11. The semi-circular toothed portions 13a of slide pawls 13 are positioned to be engaged with and disengaged from the ratchet portion 12e of second arm member 12.

As shown in FIG. 6(b), the cam element 14 has a cylindrical body 14a formed with a pair of radial projections 14b. The thickness of cam element 14 is determined to correspond with the space defined by the lateral guide groove 11e of first arm member 11 and the circular recess 12d of second arm member 12, and the length of both the radial projections 14b is determined to be shorter than the distance between each pair of spaced legs 13c of slide pawls 13. The cam element 14 is mounted on the hinge pin 17 for rotation therewith in such a manner that the radial projections 14b of cam element 14 are positioned in a lateral direction. The rollers 15 each are disposed between the respective radial projections 14a of cam element 14 and the respective spaced legs 13c of slide pawls 13.

During the assembly process of the reclining mechanism, the hinge pin 17 is coupled with the central mounting hole 11c of first arm member 11 in a condition where the slide 13 have been slidably engaged with the vertical guide groove 11d of first arm member 11. Thus, the cam element 14 is fixedly mounted on the hinge pin 17 and contained in the lateral guide groove 11e of first arm member 11. In such a condition, the rollers 15 are contained in the lateral guide groove 11e and disposed between the respective radial projections 14b of cam element 14 and the respective spaced legs 13c of slide pawls 13. Thereafter, the second arm member 12 is coupled at its lower portion 12a with the upper portion 11a of first arm member 11 for relative rotation about the hinge pin 17 and united with the first arm member 11 by engagement with upper and lower retainer plates 19a and 19b secured to the upper and lower portions 12b and 11b of second and first arm members 12 and 11. The retainer plate 19a is slidably engaged at its lower end portion with a semi-circular upper end of first arm member 11, while the retainer plate 19b is slidably engaged at its upper end portion with a semi-circular lower end of second arm member 12.

As shown in FIG. 3, a support plate 19c is riveted to the upper portion 11a of first arm member 11 and engaged with a stepped portion of hinge pin 17 to retain the hinge pin 17 in position. As shown in FIG. 1, the support plate 19c is formed with a pair of hooks 19d. The spiral torsion spring 16 is engaged at its inner end with an outer end of hinge pin 17 and at its other end with one of the hooks 19d to bias the hinge pin 17 in a counterclockwise direction so that the radial projections 14b of cam element 14 are positioned as shown in FIG. 6(a). The operation lever 18 is fixed to the outer end of hinge pin 17.

In a condition where the cam element 14 is retained in position under the load of torsion spring 16 as shown in FIG. 6(a), the rollers 15 are pressed by engagement with the radial projections 14b of cam element 14 radially outward to maintain the slide pawls 13 in engagement with the ratchet portion 12e of second arm member 12 thereby to restrict relative rotation of the second arm member 12 with respect to the first arm member 11. Thus, the back rest of the vehicle seat is retained at an inclined angle. When the operation lever 18 is operated to rotate the hinge pin 17 against the load of torsion spring 16 in a clockwise direction, the cam element 14 is rotated with the hinge pin 17 to release the rollers 15 therefrom as shown in FIG. 6(b). As a result, the rollers 15 are moved radially inwardly to permit retraction of the slide pawls 13 from the ratchet portion 12e of second arm member 12. While the operation lever 18 is retained in its operated position, the slide pawls 13 are retracted radially inwardly to permit adjustment of the inclined angle of the back rest.

When the operation lever 18 is released after adjustment of the back rest to rotate the hinge pin 17 in the counterclockwise direction under the load of torsion spring 16, the cam element 14 is rotated with the hinge pin 17 to move the rollers 15 radially outward at its radial projections 14b. As a result, the slide pawls 13 are applied with thrust force from the cam element 14 at their spaced legs 13c through the rollers 15 and brought into engagement with the ratchet portion 12e of second arm member 12 as shown in FIG. 6(a). In such a condition of the reclining mechanism, the engagement of slide pawls 13 with the ratchet portion 12e of second arm member 12 is firmly maintained by the rollers 15 retained between the spaced legs 13c of slide pawls 13 under the load or torsion spring 16 even if the reclining mechanism is applied with a heavy load.

Figure 7:
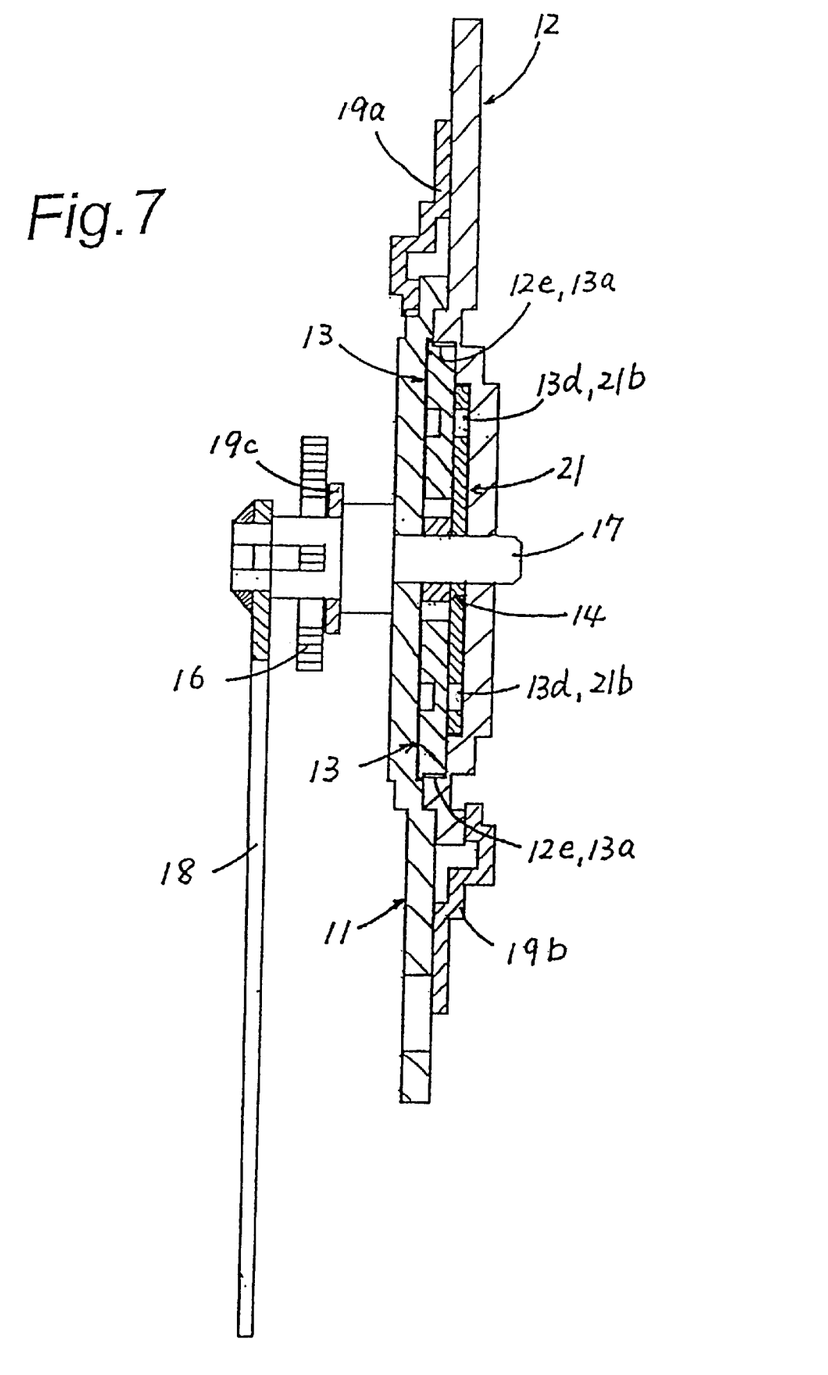
FIG. 7 is a vertical sectional view of a modification of the reclining mechanism.
Figure 8:
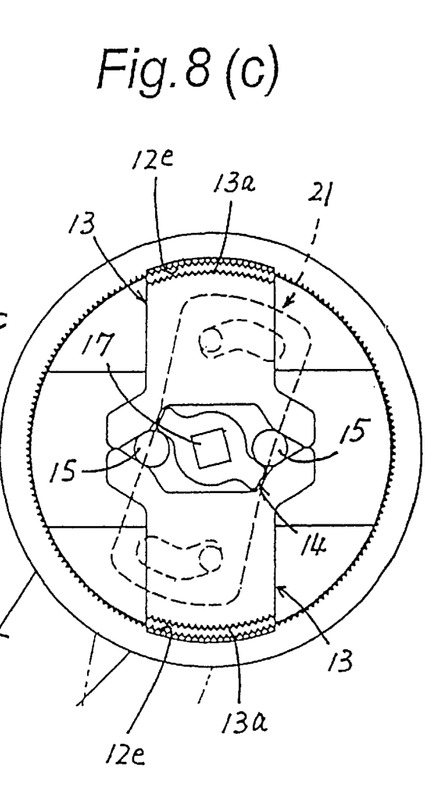
FIGS. 8(a) to (c) illustrate a mode operation of the main component parts in the modification.

Illustrated in FIG. 7 is a modification of the reclining mechanism shown in FIGS. 1 to 3, wherein a cam plate 21 is assembled with the cam element 14 to move the slide pawls 13 toward and away from the ratchet portion 12 of second arm member 12 in accordance with movement of the cam element 14. As shown in FIG. 8(b), the cam plate 21 is in the form of a rectangular plate 21a formed with a pair of diametrically opposed cam slots 21b and mounted on the hinge pin 17 for rotation therewith. The cam slots 21b each formed with an inclined portion and a horizontal portion. In this modification, the slide pawls 13 each are provided with a cam pin 13d which is slidably engaged with each of the cam slots 21b.

In a condition where the rollers 15 are pressed radially outwardly by engagement with the radial projections 14b of cam element 14 retained in position under the load of torsion spring 16 as shown in FIG. 8(a), the slide pawls 13 are maintained in engagement with the ratchet portion 12e of second arm member 12, and the cam pins 13d are located in the horizontal portions of cam slots 21b. When the operation lever 18 is operated to rotate the hinge pin 17 against the load of torsion spring 16 in a clockwise direction, the cam element 14 is rotated with the hinge pin 17 to release the rollers 15 therefrom, while the cam plate 21 is rotated with the cam element 14 to move the slide pawls 13 radially inward by engagement with their cam pins 13d. As a result, the slide pawls 13 are disengaged from the ratchet portion 12e of second arm member 12 to permit adjustment of the inclined angle of the back rest. When the operation lever 18 is released to rotate the hinge pin 17 in the counterclockwise direction under the load of torsion spring 16, the cam element 14 is rotated with the hinge pin 17 to move the rollers 15 radially outward by engagement therewith at its radial projections 14b, while the cam plate 21 is rotated with the cam element 14 to permit radial movement of the slide pawls toward the ratchet portion 12e of second arm member 12. As a result, the slide pawls 13 are brought into engagement with the ratchet portion 12e of second arm member 12 and maintained in engagement therewith.

What is claimed is:

1. A reclining mechanism for a vehicle seat, comprising:

a first arm member for attachment to a frame structure of a seat cushion or a back rest of the vehicle seat;

a second arm member for attachment to a frame structure of the other of the back rest or the seat cushion, the second arm member being connected with the first arm member by means of a hinge pin for relative rotation about the hinge pin and having a circular ratchet portion concentric with the hinge pin;

a pair of slide pawls slidably coupled with the first arm member in a radial direction with respect to the hinge pin to be moved toward and away from the ratchet portion of the second arm member; the slide pawls each being formed at their outer ends with a semi-circular toothed portion for engagement with the ratchet portion of the second arm member and at their inner ends with a pair of spaced legs;

a cam element mounted on the hinge pin for rotation therewith and disposed between the inner ends of the slide pawls, the cam element having a pair of radial projections opposed to the spaced legs of the slide pawls; and a pair of spaced rollers disposed between the radial projections of the cam element and the spaced legs of the slide pawls to maintain the slide pawls in engagement with the ratchet portion of the second arm when retained in engagement with the spaced legs of the slide pawls under load of a torsion spring applied to the cam element and to permit disengagement of the slide pawls from the ratchet portion of the second arm member when released from the spaced legs of the slide pawls by rotation of the cam element against the load of the torsion spring.

2. A reclining mechanism as claimed in claim 1, wherein a cam plate is mounted on the hinge pin for rotation therewith to disengage the slide pawls from the ratchet portion of the second arm member by engagement therewith when the cam element is rotated against the load of the torsion spring applied thereto to release the rollers from the spaced legs of the slide pawls.

3. A reclining mechanism as claimed in claim 2, wherein the cam plate is formed with a pair of diametrically opposed cam slots which are engaged with a pair of cam pins provided on the slide pawls to disengage the slide pawls from the ratchet portion of the second arm member when the cam element is rotated against the load of the torsion spring applied thereto to release the rollers from the spaced legs of the slide pawls.

* * * * *